United States Patent [19]

Sosson

[11] Patent Number: 4,650,194

[45] Date of Patent: Mar. 17, 1987

[54] SEALING JOINT BETWEEN TWO HOUSINGS CONNECTED BY TWO ORIFICES CAPABLE OF BEING OFFSET AXIALLY AND/OR RADIALLY

[75] Inventor: Pierre Sosson, Maisons-Laffitte, France

[73] Assignee: Compagnie des Transmissions Mecaniques Sedis, Levallois-Perret, France

[21] Appl. No.: 833,290

[22] Filed: Feb. 27, 1986

[30] Foreign Application Priority Data

Feb. 27, 1985 [FR] France ................................ 85 02856

[51] Int. Cl.[4] .................... F01M 11/02; F16H 57/04; F16J 15/12
[52] U.S. Cl. .......................................... 277/4; 277/30; 277/97; 277/166; 74/467; 184/6.12
[58] Field of Search .......................... 184/6.12; 74/467; 277/12, 32, 97–100, 166, 237, 4, 30

[56] References Cited

U.S. PATENT DOCUMENTS

| | | | |
|---|---|---|---|
| 3,364,776 | 1/1968 | Callahan | 74/467 |
| 3,380,555 | 4/1968 | Myers et al. | 184/6.12 |
| 3,537,712 | 11/1970 | Ruttener | 277/97 X |
| 3,548,971 | 12/1970 | Fisher | 74/467 X |
| 4,244,588 | 1/1981 | Langewisch | 277/97 X |
| 4,253,674 | 3/1981 | Fee | 277/97 X |
| 4,278,028 | 7/1981 | Eichinger et al. | 277/30 X |

FOREIGN PATENT DOCUMENTS 2271465 12/1975 France .

Primary Examiner—Robert S. Ward
Attorney, Agent, or Firm—Burns, Doane, Swecker & Mathis

[57] ABSTRACT

Sealing joint between two housings (1, 2; 14, 15; 28, 29) connected by two orifices (7, 8; 9, 11; 31, 32) capable of being offset axially and/or radially, characterized in that it comprises two stays (18, 19; 33, 37), the first of which is provided with a packing means (21, 34) made of elastic material, intended to come up against one of the housings under axial compression, so as to provide a seal in the axial direction, while the second stay (19, 37) is equipped with a packing means (22, 36) made of elastic material, intended to bear on a surface of the second housing (14, 29) and working under radial compression, and in that the two stays (18, 19; 33, 37) are joined to one another by means of an elastic joint (24, 35) providing a seal between the stays and working under radial compression and/or axial shearing. The elastic joint (24) between the two stays (18, 19) increases the possibilites of compensating the offsets between the two orifices to be connected, while at the same time maintaining an excellent seal.

4 Claims, 3 Drawing Figures

SEALING JOINT BETWEEN TWO HOUSINGS CONNECTED BY TWO ORIFICES CAPABLE OF BEING OFFSET AXIALLY AND/OR RADIALLY

The subject of the present invention is a sealing joint between two housings connected by two orifices capable of being offset axially and/or radially.

These two housings can be contiguous or non-contiguous, and their two orifices can have different or identical diameters and can be offset in both the vertical and the horizontal plane or be perfectly aligned in these two planes. The axes of the orifices also need not be parallel, and the distance separating the two outer faces of the housings in line with the orifices can be either zero or relatively great.

In other words, the two orifices need not be exactly opposite one another and can have an offset in the radial direction and/or an angular offset between their two axes, and the axial distance between the two orifices can also vary.

This situation arises, for example, between two communication orifices between an engine block and a distribution gearbox attached to one of the faces of this engine, as described in French Patent Application No. 83/07,159 in the applicant's name. The lubricating oil of the engine can penetrate into the gearbox through the two orifices, whilst it has to be sealed off from the outside.

The gaskets used hitherto to provide a seal between these two orifices against the outside can prove ineffective when the distance between the two orifices is considerable, or when the offset in the radial direction has a substantial value, for example 0.5 to 1 mm.

The object of the invention is, therefore, to provide a sealing joint of the above type, designed to prevent any leakage between the two housings towards the outside in the region of communication between the two orifices of the housings, in spite of the relative differences in position of the axes of the said orifices.

According to the invention, the sealing joint comprises two stays, the first of which is provided with a packing means made of elastic material, intended to come up against one of the housings under axial compression, so as to provide a seal in the axial direction, whilst the second stay is equipped with a packing means made of elastic material, intended to bear on a surface of the second housing and working under radial compression, and the two stays are joined to one another by means of an elastic joint providing a seal between the stays and working under radial compression and/or axial shearing.

It will be seen that the joint produced in this way makes it possible to compensate for relatively substantial offsets between the two orifices to be connected, whilst at the same time guaranteeing a satisfactory seal towards the outside. As a numerical example, any leakage of lubricant is prevented for angular offsets which can reach approximately 5° and for radial offsets reaching approximately 1 mm, which was not possible with the known joints.

According to an advantageous embodiment of the invention, the first stay carries a packing means likewise working under radial compression and preferably made in one single piece with the elastic joint and a second packing means, between which the second stay is embedded.

Other special features and advantages of the invention will emerge from the following description given with reference to the attached drawings which illustrate two embodiments of it as non-limiting examples:

FIG. 1 is a view, in partial axial section, of the opposing faces of two housings perforated with orifices which are to be connected so as to be sealed off from the outside, to allow a lubricating liquid to pass through;

Figure 1:
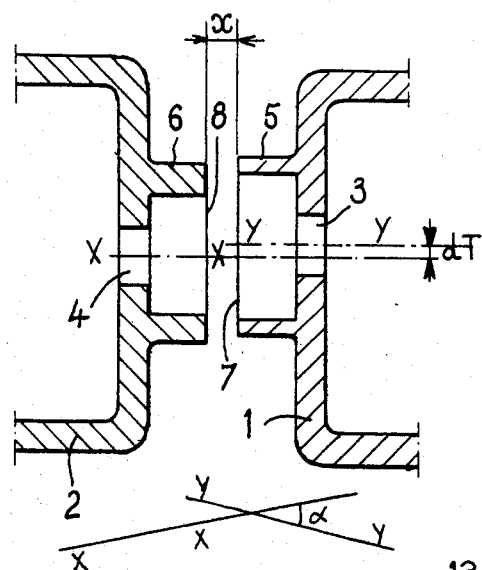

Referring to FIG. 1, this shows partially two adjacent housings 1, 2, each perforated with an opening 3, 4 which opens into a collar 5, 6 delimiting a respective opening 7, 8, these two openings being at an axial distance x from one another. The axes X—X and Y—Y of the opening 4 and orifice 8 on the one hand and of the opening 3 and the orifice 7 on the other hand can coincide with one another or can be offset a distance dT in both the vertical and the horizontal plane or in only one of these two planes, whilst remaining parallel. They also need not be parallel, in which case they have an angular offset $a$, and the distance x between the orifices 7 and 8 can vary by the amount dx.

The housings 1, 2 can, for example, be respectively that of an engine block and that of a distribution gearbox attached to an end face of this engine, the problem being to ensure that lubricating oil circulates between these two housings via the openings 7, 8 so as to be sealed off from the outside, despite the possible offsets and relative shifts mentioned above, which can be more or less substantial.

Figure 2:
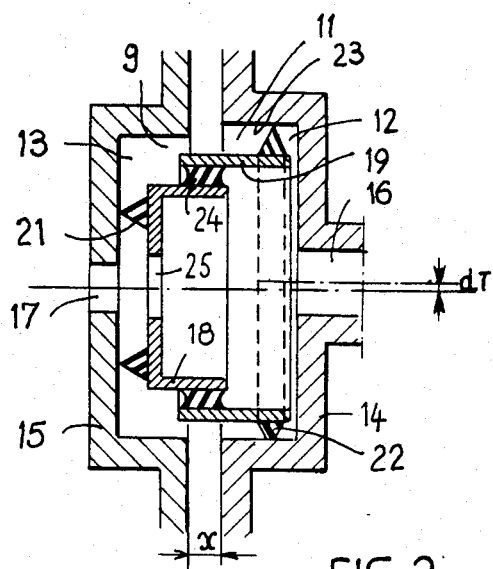
FIG. 2 is a view, in axial section, of a first embodiment of the sealing joint according to the invention, shown fitted opposite two communication orifices between two adjacent housings.

The first embodiment of the joint according to the invention, illustrated in FIG. 2, is intended to provide a seal between two orifices 9, 11 of recesses 12, 13 formed respectively in housings 14, 15, the bottoms of which are perforated with openings 16, 17, the edges of the openings 9, 11 being separated by a gap x.

The joint comprises two preferably metal stays 18, 19, the first 18 of which is provided with a packing means 21 made of elastic material, intended to come up against the bottom of the recess 13 of the housing 15 under axial compression, to provide a seal in the axial direction, whilst the second stay 19 is equipped with a packing means 22 made of elastic material, intended to bear on the cylindrical wall 23 of the orifice 11 of the second housing 14 and working under radial compression. The two stays 18, 19 are joined to one another by means of an elastic joint 24 providing a seal between the stays 18, 19 and working under radial compression and-/or axial shearing.

The packing means 21, 22 and the joint 24 are attached to the stays 18, 19 by moulding them on the latter and are preferably made of elastomer, for example rubber. The packing means 21,22 are of the lip type with a substantially triangular cross-section.

The packing means 21, because it bears on the bottom of the recess 13 of the orifice 9 of the housing 15, thus provides a seal in a plane perpendicular to the axis of communication between the two housings 14, 15, whilst the second packing means 22 bears radially on a surface which is coaxial relative to the axis of the orifices 16, 17. In this example, the first stay 18 consists of a bowl, the bottom of which is perforated with an orifice 25 for the passage of lubricant between the openings 16, 17 and substantially coaxial relative to these. The second stay 19 is formed by a ring, in which the bowl 18 is engaged and which is joined to the latter by means of the elastomer joint 24 forming an elastic annular bead allowing the stays 18, 19 to move in all directions.

The presence of the elastic joint 24 considerably increases the possibilities of compensating for the amounts of offset between the orifices 16, 17 by means of the joint, whilst at the same time maintaining an excellent seal.

Figure 3:
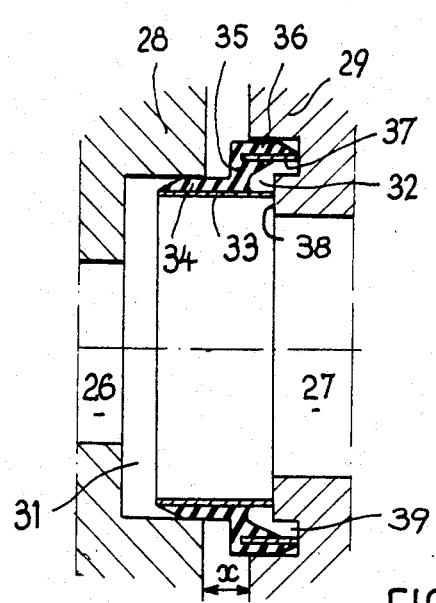
FIG. 3 is a view in axial section, similar to that of FIG. 2, of a second embodiment of the joint according to the invention.

In the second embodiment of the joint illustrated in FIG. 3, the latter seals off the passage of lubricant between two openings 26, 27 which are made in respective housings 28, 29 and which open into recesses delimiting openings 31, 32 separated by the gap x.

Here, the joint comprises a first stay 33 formed, for example, by a cylindrical bush carrying a packing means 34 which works under axial compression. The packing means 34 is preferably made in one single piece with the elastic joint 35 between the packing means 34 and the second packing means 36, the second stay 37 being embedded between the packing means 36 and the elastic joint 35.

The bush 33 bears against a collar 38 delimiting the opening 27, whilst the ring 37 is in contact with the bottom of a groove 39 in the recess of the housing 29.

Here, the variations in the axial gap x are absorbed not as a result of the compression of an elastic packing means, but because the packing means 34 penetrates to a greater or lesser extent into the recess of the opening 31. The packing means 34 bearing on the cylindrical wall delimiting the opening 31 works both under axial compression and under radial compression, whilst the packing means 36 works only under radial compression. As in the preceding embodiment, the elastomer joint 35 works under radial compression and/or axial shearing.

In this embodiment, as in the preceding one, the joint makes it possible to maintain an excellent seal between the two housings for relatively substantial axial offsets dx, radial offsets dT and angular offsets $\alpha$.

I claim:

1. A sealing joint between two housings connected by two orifices capable of being offset axially, radially, and both axially and radially, the said sealing joint comprising two stays, the first of which is provided with a first packing means made of elastic material, operable to bear against one of the housings under axial compression, to provide a seal in the axial direction, whilst the second stay is equipped with a second packing means made of elastic material, operable to bear on a surface of the second housing and working under radial compression, and wherein the two stays are joined to one another by means of an elastic joint providing a seal between the stays and working under radial compression, axial shearing, and both radial compression and axial shearing.

2. The joint as claimed in claim 1, wherein the first stay consists of a bowl, the bottom of which is perforated with an opening substantially coaxial relative to the two orifices of the housings, wherein the first packing means is molded on the said first stay, and wherein the second stay is formed by a ring, the ring and the bowl being engaged and joined by means of an elastic annular bead allowing movement in all directions between the bowl and the ring, the ring being equipped with the second packing means which is molded thereto.

3. The joint as claimed in claim 1, wherein the first and second packing means are of the lip type.

4. The joint as claimed in claim 1, wherein the first packing means carried by the first stay also works under radial compression and preferably is made in one single piece with the elastic joint and the second packing means, the second stay being embedded in the one piece between the elastic joint and the second packing means.

* * * * *